(No Model.)
R. JENNINGS.
TIRE TIGHTENER.
No. 246,143. Patented Aug. 23, 1881.
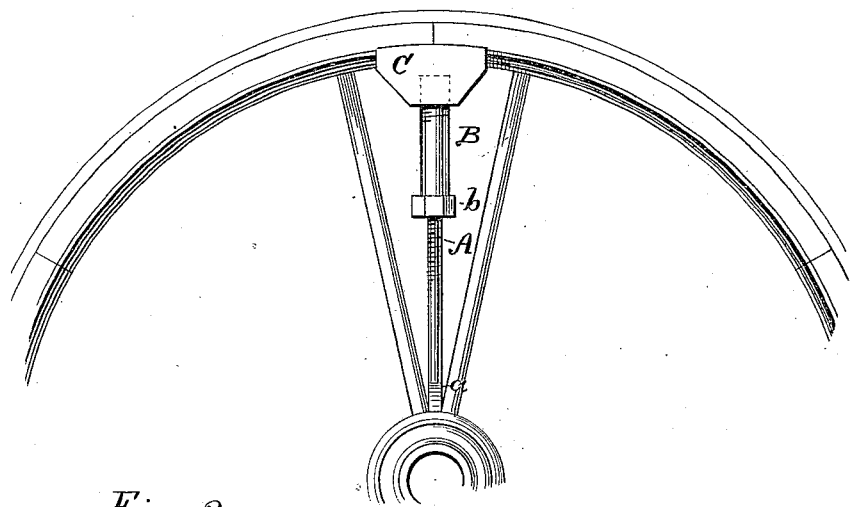
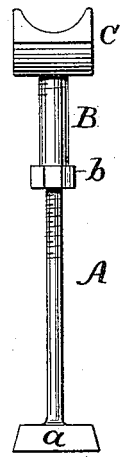
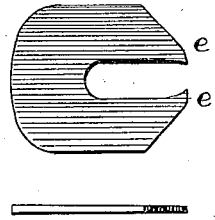
WITNESSES:
Thos. Houghton
A. G. Lyne
INVENTOR:
Russell Jennings
BY
ATTORNEYS.

UNITED STATES PATENT OFFICE.

RUSSELL JENNINGS, OF SEDALIA, MISSOURI.

TIRE-TIGHTENER.

SPECIFICATION forming part of Letters Patent No. 246,143, dated August 23, 1881.

Application filed June 7, 1881. (No model.)

*To all whom it may concern:*

Be it known that I, RUSSELL JENNINGS, of Sedalia, in the county of Pettis and State of Missouri, have invented a new and useful Improvement in Tire-Tighteners, of which the following is a full, clear, and exact description, reference being had to the accompanying drawings, forming part of this specification.

My invention relates to the class of tire-tighteners which consist in a threaded bar or screw having a vertically-movable clamp and a nut, by which, with the assistance of a winch, the said clamp is brought to bear against the fellies, and thereby separates the fellies from each other and from the spokes, where they have shrunk, the spaces thus created being filled with wedges.

My improvement consists in certain peculiarities of construction, as hereinafter set forth and claimed.

In the accompanying drawings, Figure 1 represents a side elevation of the improved tightener as applied to a wheel; Fig. 2, a view of the same in elevation, looking at it edgewise; and Fig. 3, a plan and side view of the improved spoke-tightening wedge.

A sheretofore constructed, most tire-tighteners of the above-described class have been open to the objection that they were not adapted for use upon wheels whose spokes are arranged very close together. The primary object of my invention, therefore, is to provide a device which shall be easily adjusted so as to accommodate wheels of all sizes and styles of construction.

In the accompanying drawings, A represents a screw, having its lower end formed with a base, *a*, to assist in steadying it in its upright position.

B is a hollow cylindrical tube, having one of its ends provided with a screw-thread, whereby it may be screwed into the cap or felly supporter C. This tube, which is from three to four inches in length, is placed over the screw A, so that its lower end will rest upon and be supported by the nut *b*, and the felly-supporter or clamp C shall be pressed against the under side of the felly by the operation of said nut. The clamp C is grooved out on its upper surface, so as to fit the under surface of the felly, which it is designed to support evenly throughout its entire length, which, in order to be adapted to wheels of various construction, is about three inches.

Heretofore a U-shaped wedge has been employed for filling the space between two fellies. In order to hold such a wedge firmly in position I cut off the outer corners of its two ends, as shown at *e* in the drawings, so that, as it is driven in between the abutting ends of two fellies, the ends, which pass on opposite sides of the tenon, may be forced together by coming in contact with the tire, and it will thus be held in place by means of the tenon or dowel-pin uniting the ends of the fellies.

I am aware that a bifurcated lifter or clamp has been used in combinatiation with an upright screw; but my invention is primarily designed as an improvement upon this form, since it is not adapted, owing to its branched or bifurcated shape, for being used upon all kinds of spoked wheels, while mine is so adapted.

Having thus described my invention, what I claim as new, and desire to secure by Letters Patent, is—

1. In a tire-tightener, the hollow cylindrical tube B, having a rectangular clamp or felly-supporter, C, in combination with the screw A and nut *b*, substantially as shown and described, and for the purpose set forth.

2. In a tire-tightener, a U-shaped wedge having the outer corners of its ends cut away, substantially as shown and described, whereby the said ends may be forced together by driving the wedge against the tire, as and for the purpose specified.

RUSSELL JENNINGS.

Witnesses:
GEORGE W. BARKER,
WILLIAM W. HERRON.